United States Patent
Sonderman et al.

(10) Patent No.: US 6,834,213 B1
(45) Date of Patent: Dec. 21, 2004

(54) PROCESS CONTROL BASED UPON A METROLOGY DELAY

(75) Inventors: Thomas J. Sonderman, Austin, TX (US); Jin Wang, Austin, TX (US); Naomi M. Jenkins, Round Rock, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/336,913

(22) Filed: Jan. 6, 2003

(51) Int. Cl.[7] .............................................. G06F 19/00
(52) U.S. Cl. ..................... 700/121; 700/108; 700/109; 700/110
(58) Field of Search ............................... 700/121, 108, 700/109, 110, 105, 117

(56) References Cited

U.S. PATENT DOCUMENTS 5,801,965 A * 9/1998 Takagi et al. ................. 702/35
6,584,368 B2 * 6/2003 Bunkofske et al. ........... 700/83
6,587,744 B1 * 7/2003 Stoddard et al. ............ 700/121

* cited by examiner

*Primary Examiner*—Leo Picard
*Assistant Examiner*—Charlie Kasenge
(74) *Attorney, Agent, or Firm*—Williams, Morgan & Amerson, P.C.

(57) ABSTRACT

A method and an apparatus for performing process control based upon a metrology delay. A process step is performed upon a first workpiece. Metrology data related to the first workpiece is acquired. A control adjustment based upon the metrology data is determined. A magnitude of the control adjustment is modified based upon a time period. The time period is defined by a first time frame relating to processing the first workpiece and a second time frame relating to acquiring metrology data related to the first workpiece.

29 Claims, 8 Drawing Sheets

PROCESS CONTROL BASED UPON A METROLOGY DELAY

BACKGROUND OF THE INVENTION

1. Field of the Invention

This invention relates generally to semiconductor manufacturing, and, more particularly, to a method and apparatus for performing process control based upon a delay related to metrology data.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a block diagram representation of a typical prior art process flow is illustrated. A manufacturing system may process a number of semiconductor wafers 105 within a batch/lot (block 210). Upon processing semiconductor wafers 105, the manufacturing system may acquire metrology data relating to the processed wafers 105 (block 220). The manufacturing system may then analyze the metrology data and use such analysis to calculate and perform control adjustments (block 230). Many times, there may be an appreciable delay from the time a semiconductor wafer 105 is processed to the time metrology data is acquired and/or analyzed. Upon analysis of the metrology data, the manufacturing system may calculate control adjustments based upon the analysis of the metrology data (block 240). Based upon this calculation, the manufacturing system may then perform control adjustments to subsequent processes (block 250).

Among the problems associated with the current methodology includes the fact that there may be a delay in the acquisition and/or analysis of the metrology data after a wafer 105 is processed. Therefore, by the time control adjustments are made based upon the metrology data, additional processes have been performed by a processing tool that produced the initial set of processed semiconductor wafers 105. Hence, disturbances and other process conditions may change the state/condition of the processing tool, thereby making the calculated adjustments based upon the acquired metrology data inaccurate and/or outmoded. The tool health, the disturbances experienced by the processing tool, and/or the like, may affect the validity of the calculated process adjustments. Performing feedback or feed-forward adjustments based upon outmoded metrology data analysis may cause significant errors, which may result in inferiorly processed semiconductor wafers 105.

The present invention is directed to overcoming, or at least reducing, the effects of, one or more of the problems set forth above.

SUMMARY OF THE INVENTION

In one aspect of the present invention, a method is provided for performing process control based upon a metrology delay. A process step is performed upon a first workpiece. Metrology data related to the first workpiece is acquired. A control adjustment based upon the metrology data is determined. A magnitude of the control adjustment is modified based upon a time period. The time period is defined by a first time frame relating to processing the first workpiece and a second time frame relating to acquiring metrology data related to the first workpiece.

In another aspect of the present invention, a system is provided for performing process control based upon a metrology delay. The system includes a processing tool to process a plurality of workpieces and a metrology tool to acquire metrology data. The system also includes a process controller operatively coupled to the processing tool and to the metrology tool. The process controller is adapted to determine a control adjustment based upon the metrology data and modify a magnitude of the control adjustment based upon a time period. The time period is defined by a first time frame relating to processing the workpiece and a second time frame relating to acquiring metrology data related to the workpiece.

In another aspect of the present invention, an apparatus is provided for performing process control based upon a metrology delay. The apparatus includes a process controller adapted to determine a control adjustment based upon metrology data relating to processing a workpiece. The process controller is also adapted to determine a control adjustment based upon the metrology data and modify a magnitude of the control adjustment based upon a time period. The time period is defined by a first time frame relating to processing the workpiece and a second time frame relating to acquiring metrology data related to the workpiece.

In yet another aspect of the present invention, a computer readable program storage device encoded with instructions is provided for performing process control based upon a metrology delay. The computer readable program storage device encoded with instructions that, when executed by the computer, performs a method, which comprises: performing a process step upon a first workpiece; acquiring metrology data related the first workpiece; determining a control adjustment based upon the metrology data; and modifying a magnitude of the control adjustment based upon a time period defined by a first time frame relating to processing the first workpiece and a second time frame relating to acquiring metrology data related to the first workpiece.

BRIEF DESCRIPTION OF THE DRAWINGS

The invention may be understood by reference to the following description taken in conjunction with the accompanying drawings, in which like reference numerals identify like elements, and in which.

Figure 1:
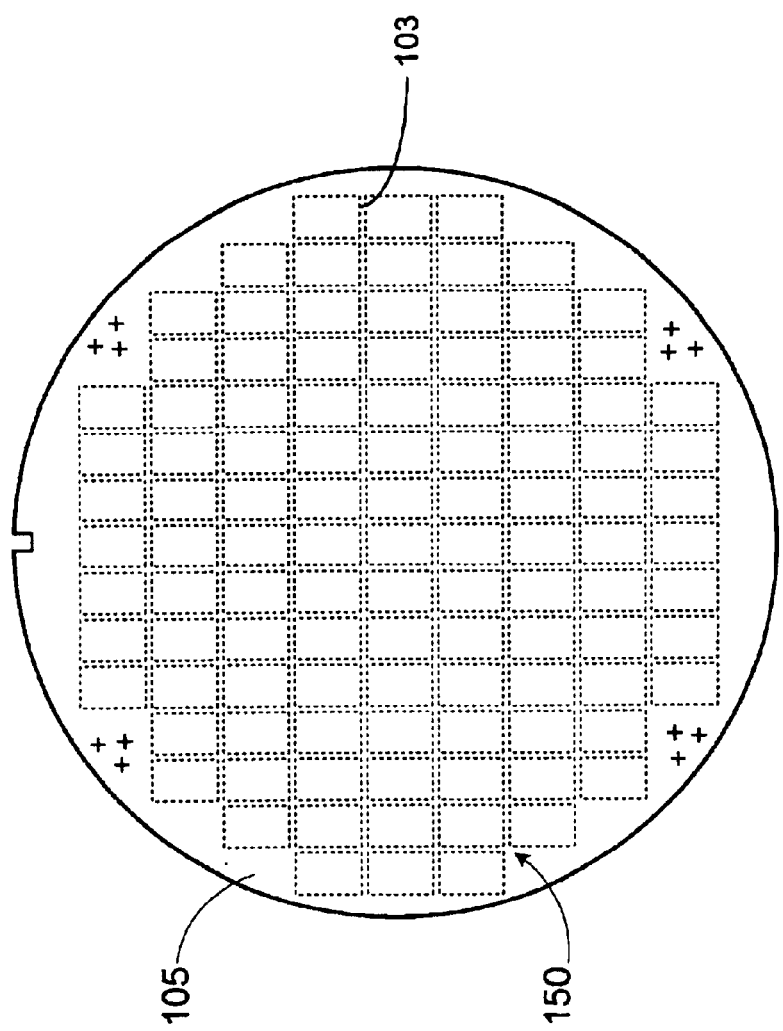
FIG. 1 is a simplified diagram of a prior art semiconductor wafer being processed.
Figure 2:
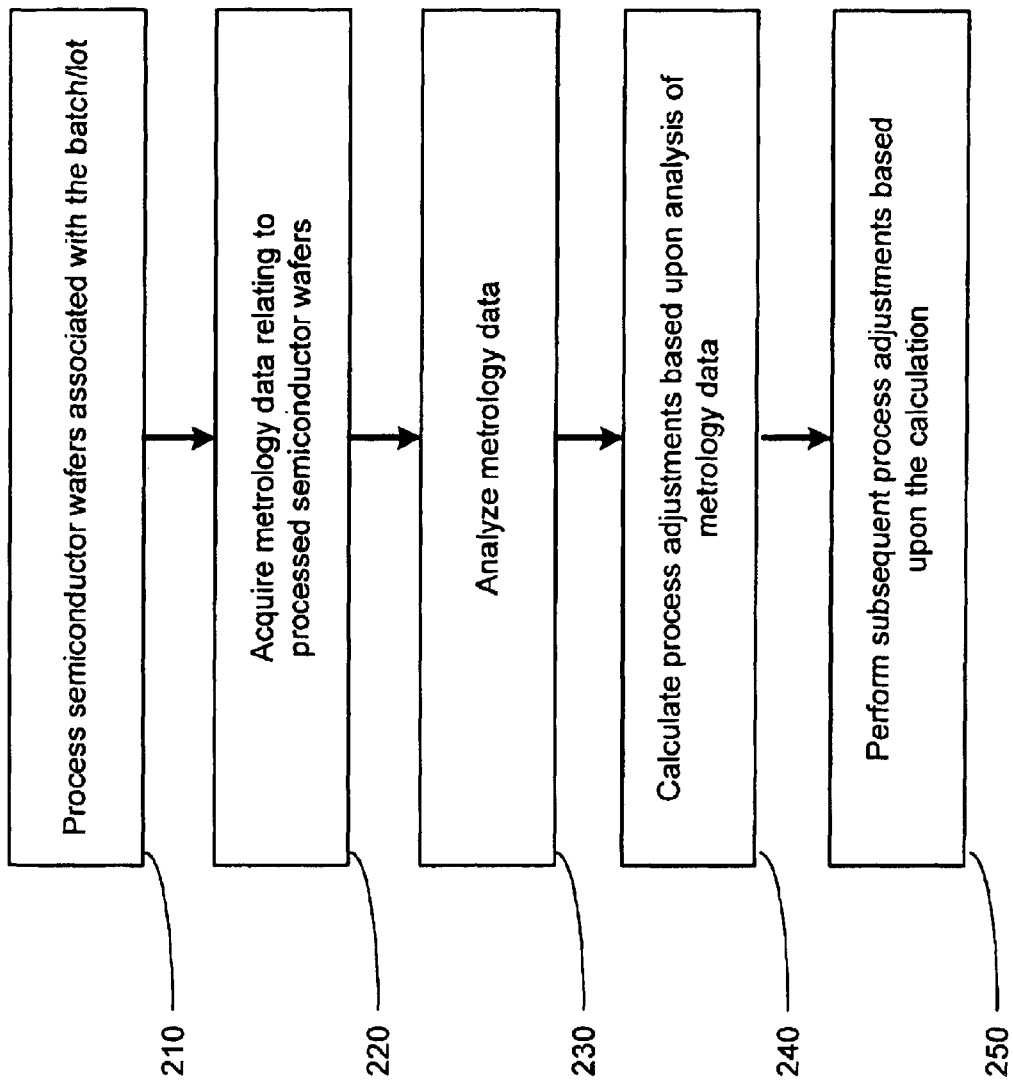
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for modifying or qualifying a calculated control adjustment parameter to compensate for a delay associated with the acquisition and analysis of metrology data. The present invention calls for analyzing disturbances experienced by a processing tool, the tool health, the lag in acquiring metrology data, and/or the like to adjust the magnitude of a control adjustments. In other words, utilizing the external factors described above, such as the disturbances experienced by the tool, the tool health, the time-lag in acquiring metrology data, and the like, the magnitude of the calculated control adjustments may be reduced or increased. This adjustment provides for more accurate feedback/feed-forward control adjustments when processing semiconductor wafers 105.

Figure 3:
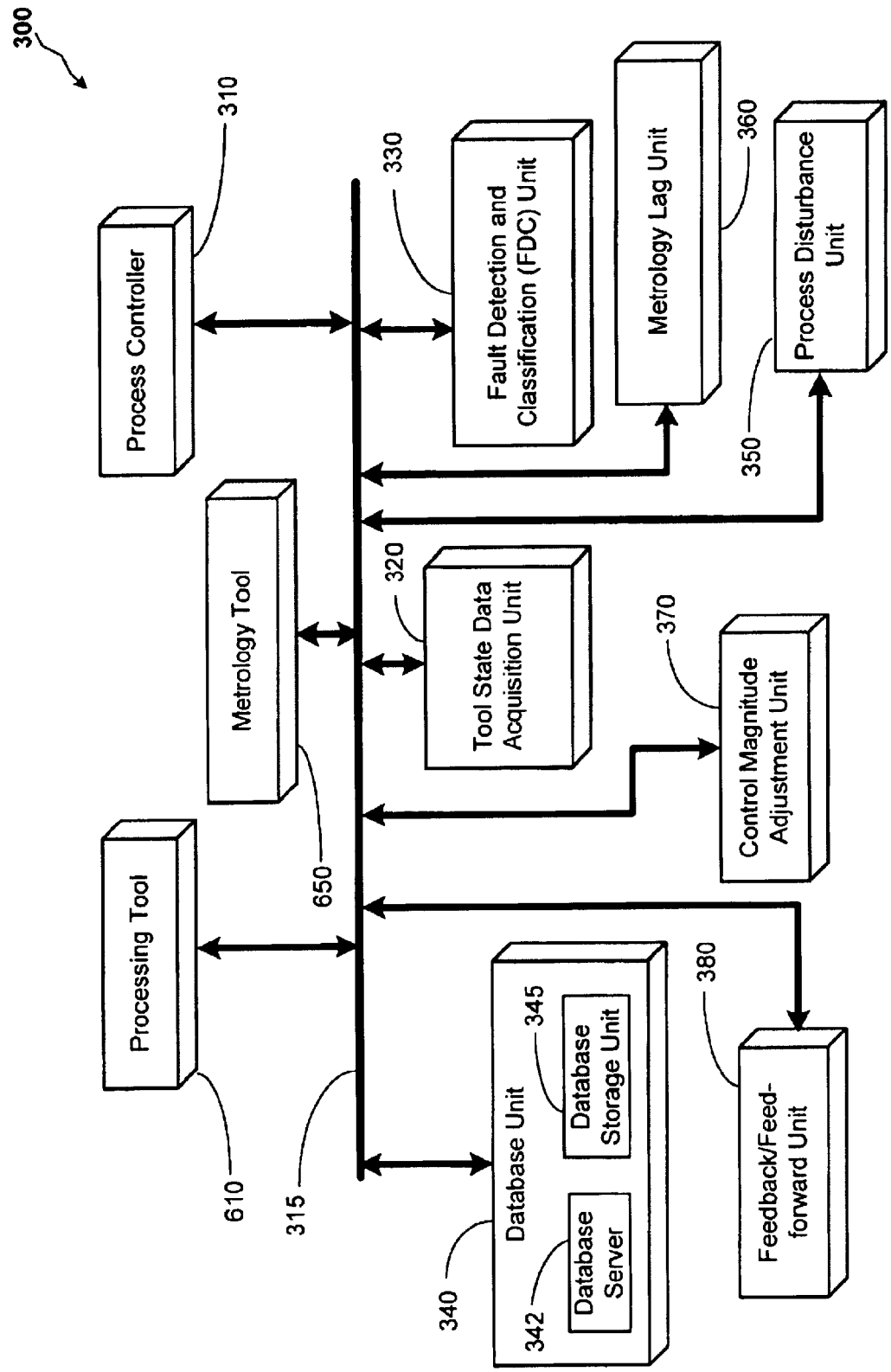
FIG. 3 provides a block diagram representation of a system in accordance with one illustrative embodiment of the present invention.

Turning now to FIG. 3, a block diagram depiction of a system 300 in accordance with embodiments of the present invention is illustrated. A process controller 310 in the system 300 is capable of controlling various operations relating to a processing tool 610. The system 300 is capable of acquiring manufacturing related data, such as metrology data related to processed semiconductor wafers 105, tool state data, and the like. The system 300 may also comprise a metrology tool 650 to acquire metrology data related to the processed semiconductor wafers 105.

The system 300 may also comprise a database unit 340. The database unit 340 is provided for storing a plurality of types of data, such as metrology data, data related to the operation of the system 300 (e.g., the status of the processing tool 610, the status of semiconductor wafers 105, etc.), and the like. The database unit 340 may store tool state data relating to a plurality of process runs performed by the processing tool 610. The database unit 340 may comprise a database server 342 for storing tool state data and/or other manufacturing data related to processing semiconductor wafers 105 into a database storage unit 345.

The system 300 may also comprise a tool state data acquisition unit 320 for acquiring tool state data. The tool state data may include pressure data, temperature data, humidity data, gas flow data, various electrical data, and the like, related to operations of the processing tool 610. Exemplary tool state data for an etch tool may include gas flow, chamber pressure, chamber temperature, voltage, reflected power, backside helium pressure, RF tuning parameters, etc. Tool state data may also include data external to the processing tool 610, such as ambient temperature, humidity, pressure, etc. A more detailed illustration and description of the tool state data acquisition unit 320 is provided in FIG. 4 and accompanying description below.

The system 300 also comprises a fault detection and classification unit (FDC) 330 capable of performing various fault detection analyses relating to the processing of semiconductor wafers 105. The fault detection and classification unit 330 is capable of providing data relating to faults during processing of semiconductor wafers 105. Fault detection analysis performed by the fault detection and classification unit 330 may include analysis of tool state data and/or metrology data. The FDC unit 330 may correlate particular tool state data to errors detected on the processed semiconductor wafers 105 by analyzing the metrology tool data. For example, particular errors, such as critical dimension errors discovered on the processed semiconductor wafers 105 may be correlated to particular gas flow rates or temperature data relating to tool state data. The fault detection performed by the FDC unit 330 may also include analyzing data from in situ sensors integrated into the processing tools 610. Furthermore, the FDC unit 330 may provide data relating to the tool health. More specifically, the FDC unit 330 may provide tool health data that includes an indication whether the processing tool 610 is experiencing a gradual change in operation or an impulse change in the tool that is not permanent.

A process disturbance unit 350 in the system 300 may provide an indication of process disturbances experienced by the processing tool 610. Process disturbances may include external variables that may affect the operation of a process from a modeled point. In one embodiment, the process disturbance may be calculated by analyzing the predicted output and comparing it to the actual process output and using the difference between them to estimate the magnitude of the process disturbance. The process disturbance may be used to calculate an uncertainty factor relating to the prediction of the process outcome.

The system 300 also comprises a metrology lag unit 360 that is capable of calculating a delay in acquiring metrology data. A number of semiconductor wafers 105 may be processed in the time period between processing wafers 105 and performing analysis of the metrology data (e.g., analysis of wafer state measurements). Therefore, a finite amount of metrology lag/jeopardy (e.g., a number of wafers 105 that may have process errors) may be calculated. Changes in the process conditions may be due to several factors, such as process disturbance, degradation of tool health, and the like, which may affect the calculation of control adjustments. The changes, such as disturbance and tool health degradation may occur in the time period between the processing of a wafer 105 and the acquisition of metrology data from that wafer 105. Along with the process disturbance factor, the tool health factor and the like, the metrology lag unit 360 may provide a parameter that may be used to calculate modification(s) to the variables chosen for process adjustments.

A control magnitude adjustment unit 370 may calculate a modification that is to be made to the magnitude of a control adjustment resulting from the metrology data. In other words, even if the metrology data indicates that an adjustment of a factor of "x" is to be performed, the control magnitude adjustment unit 370 may provide that the factor "x" should be attenuated to produce an adjustment factor of $V\frac{1}{2}$ times x as the new magnitude relating to the control adjustment. A feedback/feed-forward unit 380 is then capable of adjusting the magnitude of the calculated control adjustment such that more accurate feedback corrections and/or feed-forward adjustments may be performed.

Additionally, if a fault occurs during a metrology delay time period, an alternative classification of the fault may be defined by the FDC unit 330. This alternative classification may allow the control magnitude adjustment unit 370 to assign a different weight or priority to the fault than it otherwise would have if the particular fault had occurred during a different time period. In other words, if a particular fault occurs during a metrology time lag, the control magnitude adjustment unit 370 may treat the fault differently as compared a reaction to the same type of fault that occurs outside the metrology time lag. In one embodiment, the magnitude adjustment unit 370 attenuates the normal reaction to a fault if the particular fault is defined to have occurred within a metrology delay time period.

In an alternative embodiment, the FDC unit 330 may send fault classification data to the control magnitude adjustment unit 370. If the fault classification indicates that a fault may have occurred during the metrology delay time period, an attenuated control response may performed. Therefore, upon receiving the fault classification data that indicates that a fault has occurred during the metrology delay time period, the control magnitude adjustment unit 370 reduces the magnitude of the normal control adjustment that would have been made to the process in response to the particular fault. Real time data or near real time data from the FDC unit 330 may be filtered by the control magnitude adjustment unit 370 so attenuated process control response may be performed to reduce the possibility of over-compensation or outmoded process corrections in response to detected faults. Therefore, a special fault classification for faults detected during the metrology delay time period may be used by the control magnitude adjustment unit 370 in order to implement an attenuated process control response when appropriate.

The process controller 310, FDC unit 330, process disturbance unit 350, metrology lag unit 360, control magnitude adjustment unit 370, and/or the feedback/feed-forward unit 380 may be software, hardware, or firmware units that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
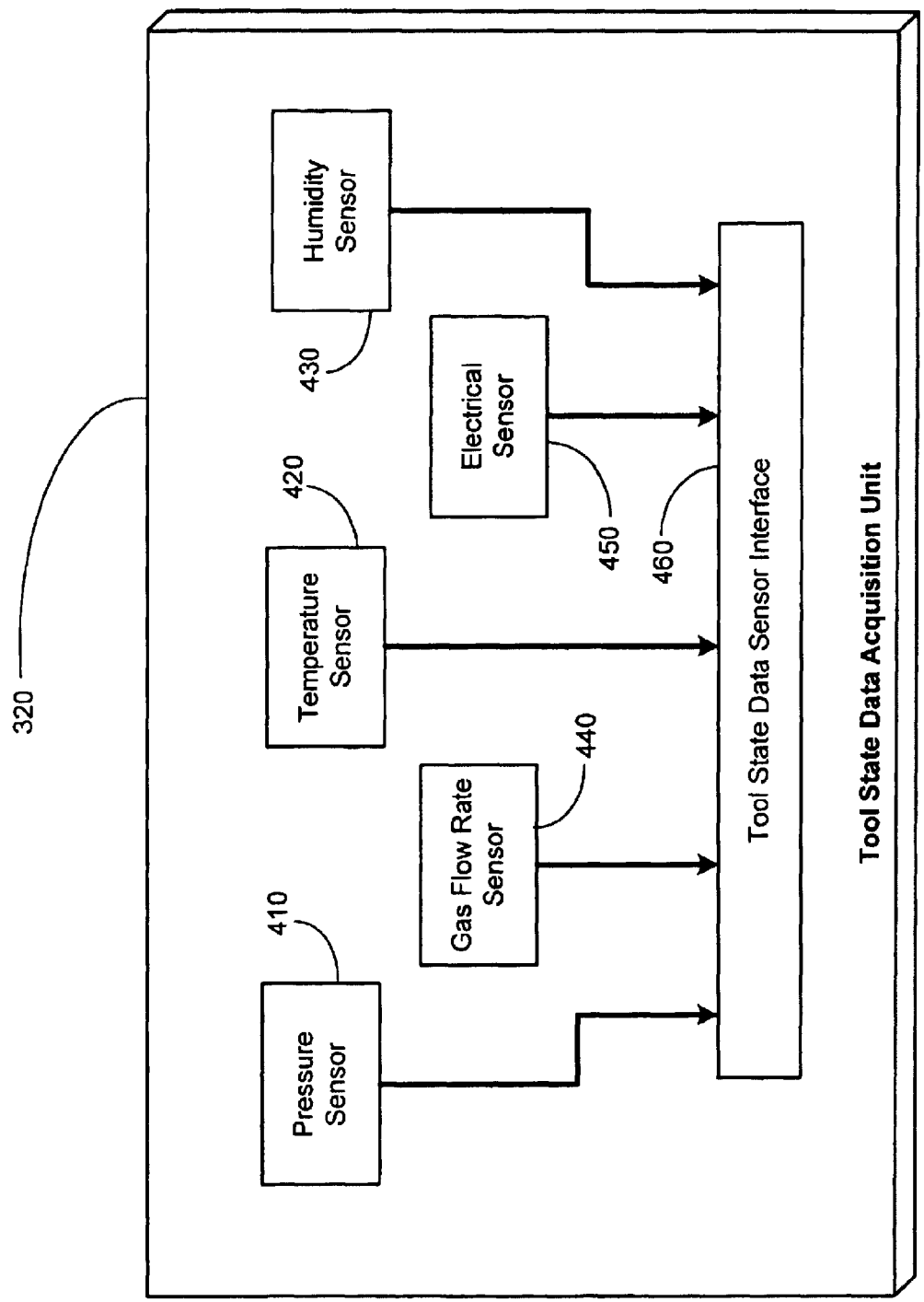
FIG. 4 illustrates a more detailed block diagram representation of a tool state data acquisition unit of FIG. 3, in accordance with one illustrative embodiment of the present invention.

Turning now to FIG. 4, a more detailed block diagram depiction of the tool state data acquisition unit 320 illustrated in FIG. 3, is provided. The tool state data acquisition unit 320 may comprise any of a variety of different types of sensors, e.g., a pressure sensor 410, a temperature sensor 420, a humidity sensor 430, a gas flow rate sensor 440, and an electrical sensor 450, etc. In an alternative embodiment, the tool state data acquisition unit 320 may comprise in situ sensors that are integrated into the processing tool 610. The pressure sensor 410 is capable of detecting the pressure within the processing tool 610. The temperature sensor 420 is capable of sensing the temperature of various portions of the processing tool 610. The humidity sensor 430 is capable of detecting the relative humidity at various portions in the processing tool 610, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current provided to a lamp used in a photolithography process. The tool state data acquisition unit 320 may also comprise other sensors capable of detecting a variety of manufacturing variables known to those skilled in the art having benefit of the present disclosure. The tool state data acquisition unit 326 may also comprise a tool state sensor data sensor interface 460. The tool state data sensor interface 460 may receive sensor data from the various sensors that are contained within, or associated with, the processing tool 610 and/or the tool state data acquisition unit 320 and transmit the data to the process controller 310.

Figure 5:
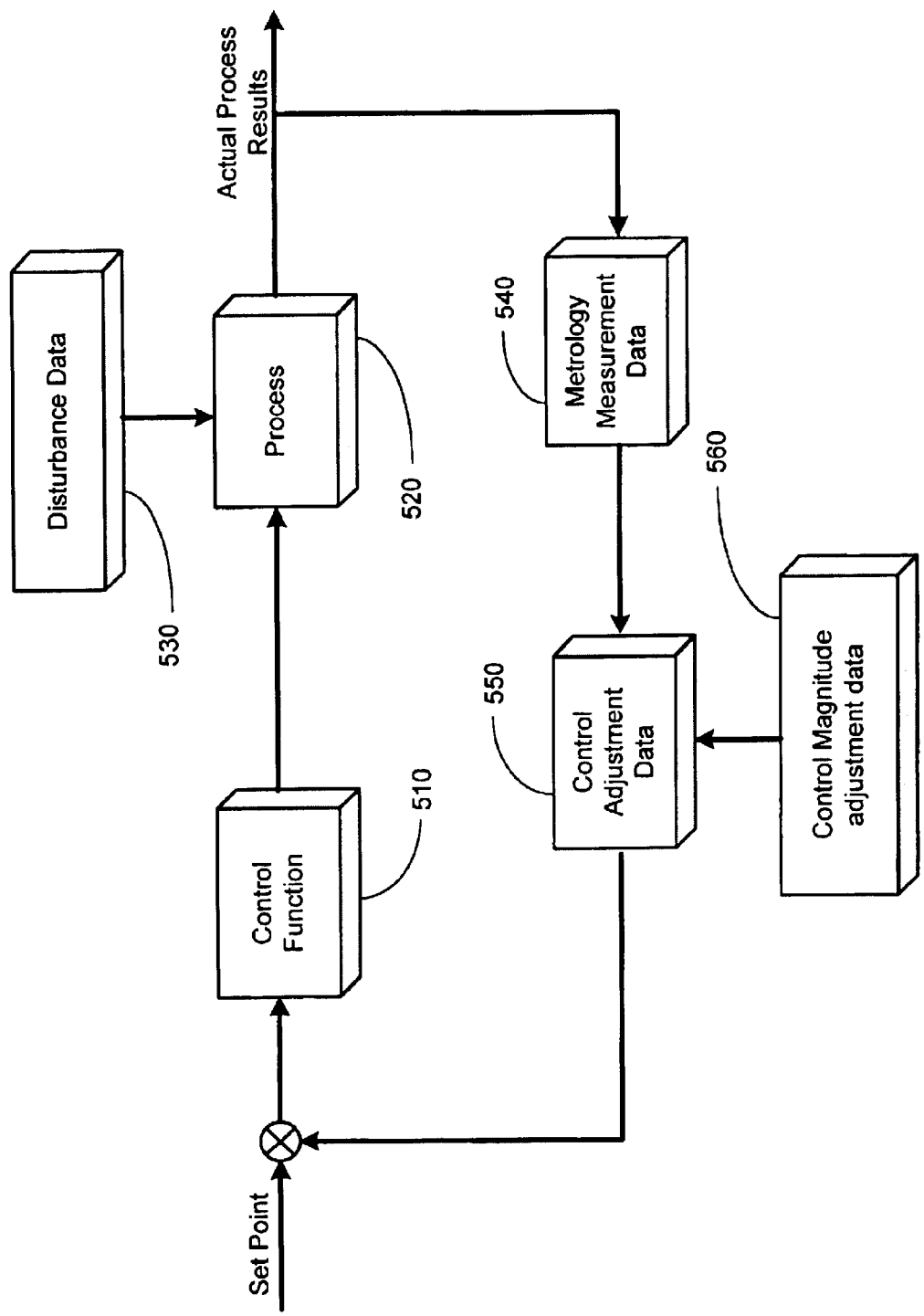
FIG. 5 illustrates a more detailed block diagram representation of a process control flow in accordance with one illustrative embodiment of the present invention.

Turning now to FIG. 5, a block diagram of a process control flow in accordance with one embodiment of the present invention is illustrated. A set point provides values of control parameters that are used to perform a control function (see block 510). This control function is used to perform a process upon one or more semiconductor wafers 105 (block 520). The process is performed using data from the control function (block 510). The process may also receive disturbance data (block 530) relating to disturbances experienced by a processing tool 610 associated with the process. The output of the process provides the actual process results.

Data relating to the actual process results is fed back as metrology measurement data files (block 540), which is used to generate control adjustment data (block 550). The control adjustment data may be influenced by the data relating to the control magnitude adjustment unit 370 (block 560). Utilizing disturbances, tool health trends, metrology delay, and the like, adjustment(s) to the magnitude of the control adjustments calculated in block 550 is generated. Therefore, the set point is modified by the newer control adjustments whose magnitude has either increased or decreased by the control magnitude adjustment unit 370. Therefore, a more accurate and robust execution of processed controls is possible. Instead of utilizing a simple feedback of metrology measurement adjustments to adjust the set point to control and process semiconductor wafers 105, disturbance data, tool health trend data, and the like, are used to more accurately adjust the set point control to perform a more accurate control of the process.

Figure 6:
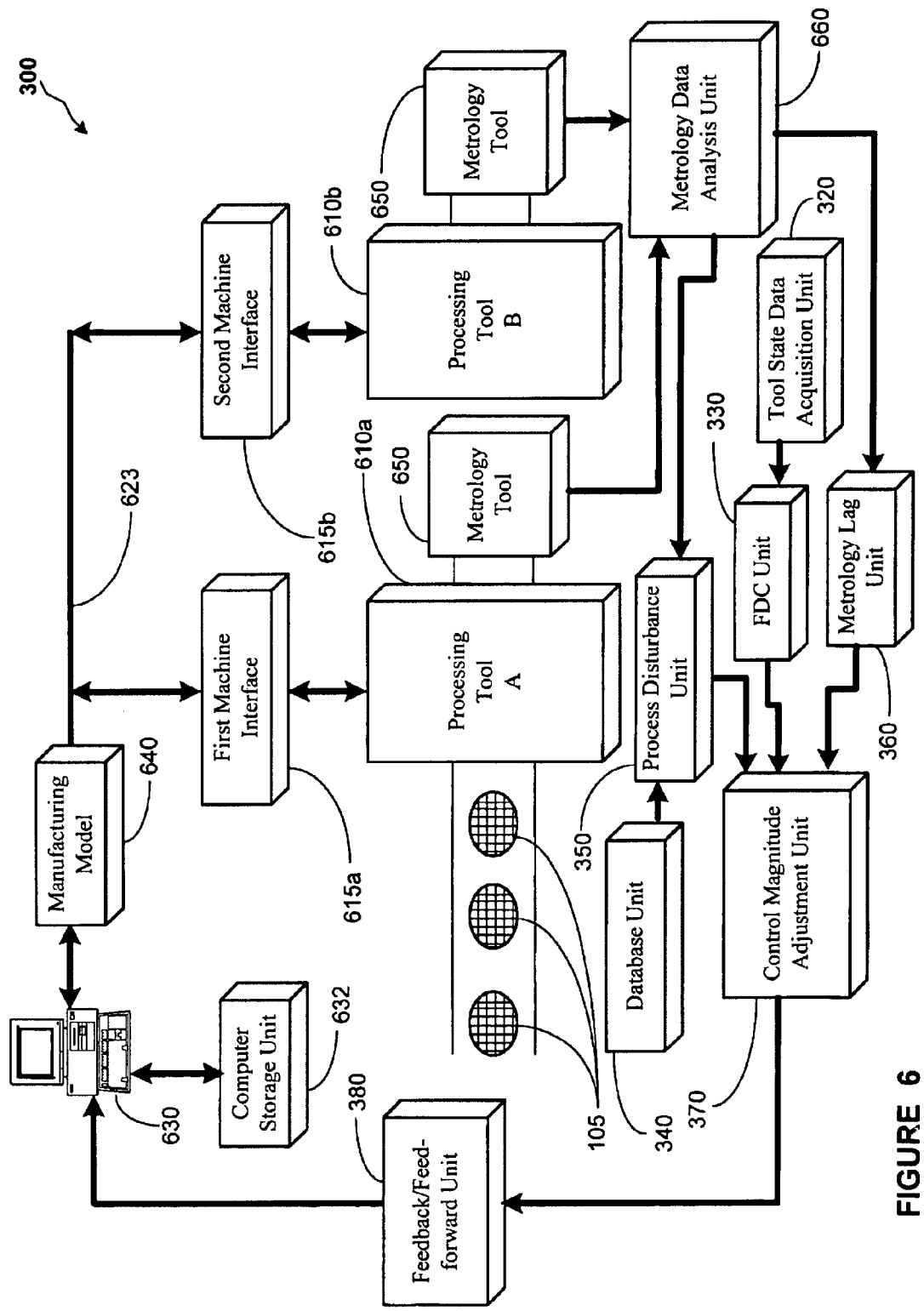
FIG. 6 illustrates a more detailed block diagram representation of the system shown in FIG. 3, in accordance with one illustrative embodiment of the present invention.

Turning now to FIG. 6, a more detailed block diagram of the system 300 in accordance with one embodiment of the present invention is illustrated. Semiconductor wafers 105 are processed on processing tools 610a, 610b using a plurality of control input signals, or manufacturing parameters, provided via a line or network 623. The control input signals, or manufacturing parameters, on the line 623 are sent to the processing tools 610a, 610b from a computer system 630 via machine interfaces 615a, 615b. The first and second machine interfaces 615a, 615b are generally located outside the processing tools 610a, 610b. In an alternative embodiment, the first and second machine interfaces 615a, 615b are located within the processing tools 610a, 610b. The semiconductor wafers 105 are provided to and carried from a plurality of processing tools 610. In one embodiment, semiconductor wafers 105 may be provided to a processing tool 610 manually. In an alternative embodiment, semiconductor wafers 105 may be provided to a processing tool 610 in an automatic fashion (e.g., robotic movement of semiconductor wafers 105). In one embodiment, a plurality of semiconductor wafers 105 is transported in lots (e.g., stacked in cassettes) to the processing tools 610.

In one embodiment, the computer system 630 sends control input signals, or manufacturing parameters, on the line 623 to the first and second machine interfaces 615a, 615b. The computer system 630 is capable of controlling processing operations. In one embodiment, the computer system 630 is a process controller. The computer system 630 is coupled to a computer storage unit 632 that may contain a plurality of software programs and data sets. The computer system 630 may contain one or more processors (not shown) that are capable of performing the operations described herein. The computer system 630 employs a manufacturing model 640 to generate control input signals on the line 623. In one embodiment, the manufacturing model 640 contains a manufacturing recipe that determines a plurality of control input parameters that are sent on the line 623 to the processing tools 610a, 610b.

In one embodiment, the manufacturing model 640 defines a process script and input control that implement a particular manufacturing process. The control input signals (or control input parameters) on the line 623 that are intended for processing tool A 610a are received and processed by the first machine interface 615a. The control input signals on the line 623 that are intended for processing tool B 610b are received and processed by the second machine interface 615b. Examples of the processing tools 610a, 610b used in semiconductor manufacturing processes are steppers, etch process tools, deposition tools, and the like.

One or more of the semiconductor wafers 105 that are processed by the processing tools 610a, 610b can also be sent to a metrology tool 650 for acquisition of metrology data. The metrology tool 650 may be a scatterometry data acquisition tool, an overlay-error measurement tool, a critical dimension measurement tool, and the like. In one embodiment, a metrology tool 650 examines one or more processed semiconductor wafers 105. The metrology data analysis unit 660 may collect, organize, and analyze data from the metrology tools 650. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 610.

As described above, data from the metrology data analysis unit 660 is received by the process disturbance unit 350 for examination of disturbances experienced by the processing tool 610. The process disturbance unit 350 may also receive stored manufacturing data from the database unit 340. The process disturbance unit 350 provides process disturbance data to the control magnitude adjustment unit 370. Additionally, the FDC unit 330 receives data from the tool state data acquisition unit 320 to provide fault detection and/or tool health data to the control magnitude adjustment unit 370. The metrology lag unit 360 provides metrology lag/jeopardy data to the control magnitude adjustment unit 370 for determining how much the disturbance and the tool health has affected the process operation during the time lag between processing the wafer 105 and acquiring/analyzing metrology data from the semiconductor wafers 105. The control magnitude adjustment unit 370 then provides modified parameter adjustment data to the feedback/feed-forward unit 380, which may include an increase or decrease factor for modifying the magnitude of the calculated control adjustments. Based upon the modified control adjustments, the feedback/feed-forward unit 380 then performs feedback and/or feed-forward adjustments to the process. This process may result in more accurately processed semiconductor wafers 105.

Figure 7:
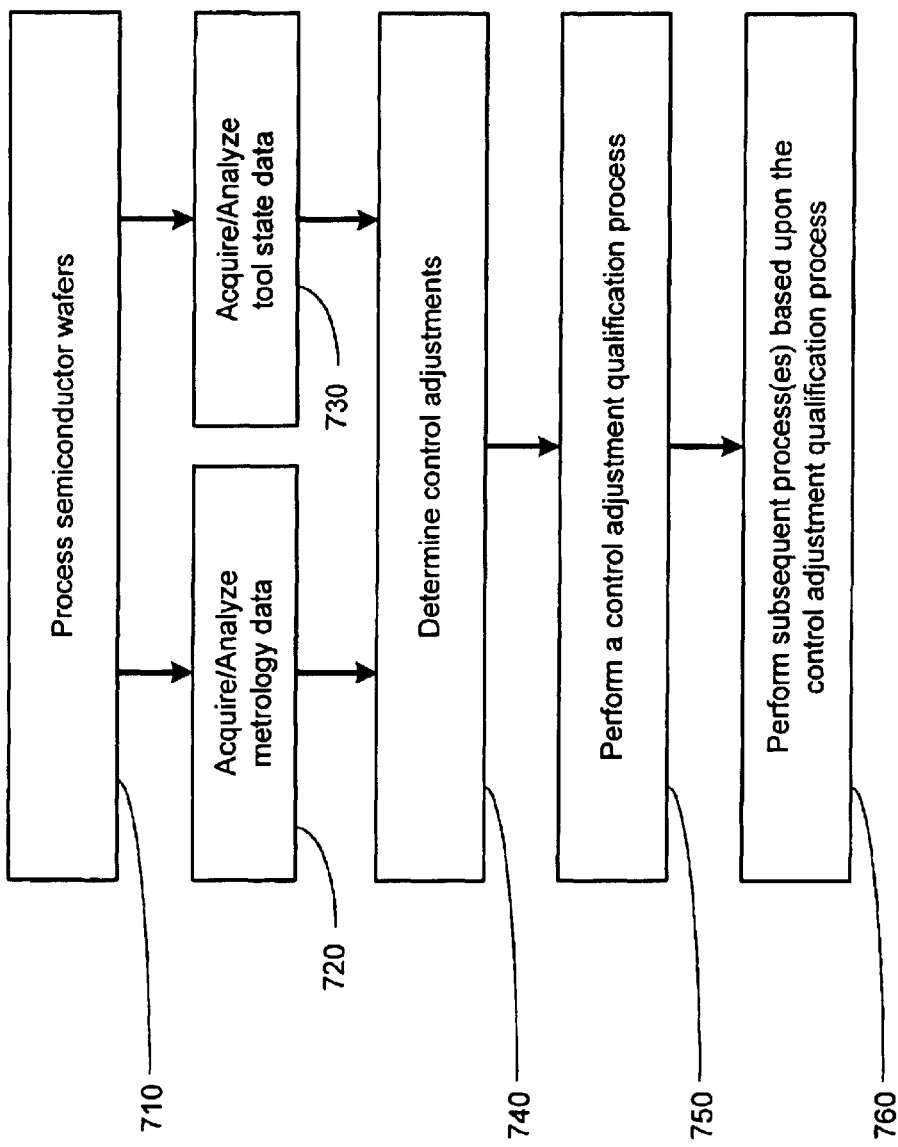
FIG. 7 illustrates a flowchart depiction of a method in accordance with one illustrative embodiment of the present invention.

Turning now to FIG. 7, a flow chart depiction of embodiments in accordance with the present invention is illustrated. The system 300 processes semiconductor wafers 105, which in one embodiment, may be associated with a lot/batch (block 710). The system 300 then acquires and analyzes metrology data relating to the processed semiconductor wafers 105 (block 720). Additionally, the system 300 acquires and analyzes tool state data (block 730) in order to provide data relating to the tool health. The analyzed metrology data and/or the tool health data are then used to determine control adjustments to be made to correct or reduce the affects of errors on the processed semiconductor wafers 105 (block 740). The system 300 may then perform a control adjustment qualification process to qualify the control adjustments calculated by the system 300 (block 750).

Qualifying the control adjustments may include reducing or increasing the magnitude of the adjustments to the process controller 310. This may reduce the possibility of under-compensating and/or over-compensating process adjustments in response to the analysis of the metrology data. A more detailed description of the control adjustment qualification process indicated in block 750 is provided in FIG. 8 and accompanying description below. The system 300 may then perform subsequent processes based upon the control adjustment qualification process (block 760). Upon implementing the process based upon the control adjustment qualification, more accurate feedback/feed-forward correction to the processes may be made.

Figure 8:
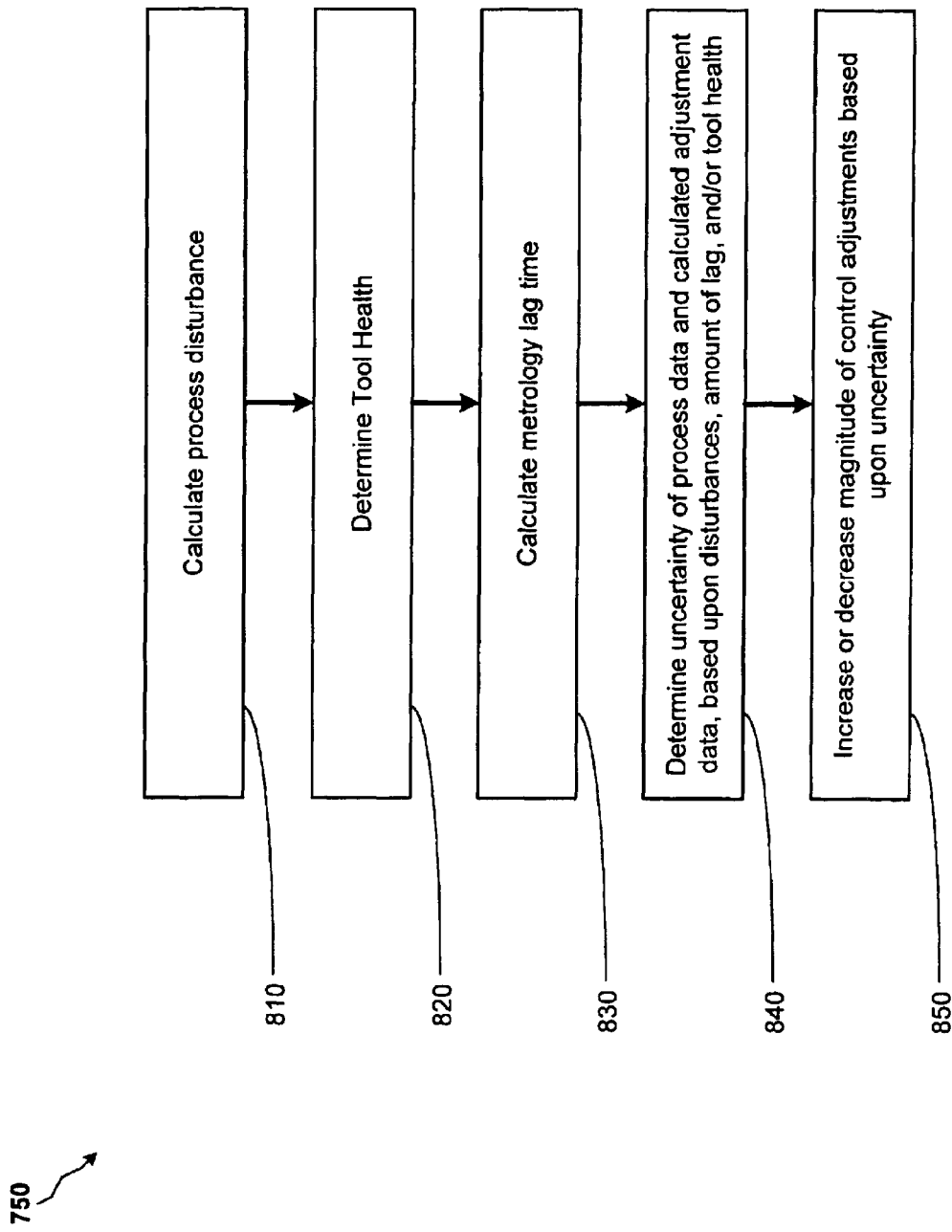
FIG. 8 illustrates a more detailed flowchart depiction of a method of performing a control adjustment qualification process, as indicated in FIG. 7, in accordance with one illustrative embodiment of the present invention.

Turning now to FIG. 8, a more detailed flow chart depiction of the step of performing the control adjustment qualification process as indicated in block 750 is illustrated. The system 300 may calculate process disturbances experienced by the processing tools (block 810). The disturbances may be calculated using the difference between the actual and predicted process results and performing an estimation of the amount of disturbance experienced by the system 300. The system 300 may also determine the tool health relating to the processing tools 610 (block 820). The tool health may be based upon a trend in the gradual change in the health of the processing tools 610. An impulse change in the tool health may not be used to adjust the control adjustments. Tool health data may be based upon the acquired tool state data. Furthermore, a metrology lag time (which relates to a time delay between processing a wafer 105 and analyzing metrology data related to the wafer 105) may be calculated by the system 300 (block 830).

Based upon the metrology lag time, the system 300 is able to determine the amount of disturbance and/or the change(s) in the tool health during the metrology time lag, which may affect the validity of the calculated adjustments based upon the metrology tool data. Utilizing the metrology lag time, an indication regarding the amount of disturbances and the changes in the tool health experienced by the system 300 may be determined. Based upon the amount of disturbance and/or tool health changes during the metrology lag time, an amount of uncertainty relating to the process data and the calculated adjustment data may be determined (block 840). The greater the disturbances and/or the changes in the tool health, the greater the amount of uncertainty.

Based upon the uncertainty level of the process adjustments calculated, an increase or a decrease in the magnitude of the calculated control adjustments may be made (block 850). In other words, a smaller amount of adjustment is made in response to a longer lag time, which may provide an indication that a higher amount of disturbance and/or changes in the tool health may have occurred (i.e., higher level of uncertainty). If the level of uncertainty is found to be greater than a predetermined threshold, then the magnitude of the control adjustment is reduced. In an alternative embodiment, an increase in the magnitude of the calculated control adjustments may be made in response to a lower amount of uncertainty. Using the uncertainty factor, an increase or decrease in the magnitude of the control adjustments may be made, such that the possibility of implementation of outmoded control adjustments is reduced.

Utilizing embodiments of the present invention, more accurately processed semiconductor wafers 105 are possible. Many times in manufacturing systems, there is a lag time between the processing of a wafer 105 and the acquisition of metrology data. Several events can cause calculated control adjustments based on the metrology data to be outmoded. Utilizing the process disturbance data, the tool health data, in conjunction with the lag time, more accurate wafer state and tool state estimation may be made and more accurate control adjustments may be implemented. The calculated control adjustments may be decreased or increased in magnitude, such that a reduced or increased control adjustment is made to reduce the possibility of over-compensation or under-compensation. Utilizing the process of modifying the magnitude of control adjustments, semiconductor wafers 105 may be more accurately processed.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699 Provisional Specification for CIM Framework Domain Architecture) and APC (SEMI E93-0999-Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention Accordingly, the protection sought herein is as set forth in the claims below.

What is claimed:

1. A method, comprising:
   performing a process step upon a first workpiece;
   acquiring metrology data related to said first workpiece;
   determining a control adjustment based upon said metrology data;
   determining an uncertainty level relating to said control adjustment; and
   modifying a magnitude of said control adjustment based upon said uncertainty level associated with a time period defined by a first time frame relating to processing said first workpiece and a second time frame relating to acquiring metrology data related to said first workpiece.

2. The method of claim 1, wherein performing said process step upon said workpieces further comprises performing said process step upon a semiconductor wafer.

3. The method of claim 1, further comprising implementing said modified control adjustment for processing a second workpiece.

4. The method of claim 3, wherein determining a control adjustment based upon said metrology data further comprises analyzing said metrology data, determining whether a process error exists on said first workpiece, and modifying at least one control input parameter for processing said second workpiece.

5. The method of claim 1, wherein modifying said magnitude of said control adjustment based upon said time period further comprises:
   calculating a process disturbance relating to processing said first workpiece;
   determining a tool health relating to processing said first workpiece;
   determining an uncertainty level relating to said calculated control adjustments based upon said process disturbance and said tool health within said time period; and
   reducing said magnitude of said process adjustment based upon a determination that said uncertainty level is above a predetermined threshold.

6. The method of claim 1, wherein calculating a process disturbance relating to processing said first workpiece further comprises calculating a difference between a predicted process result and an actual process result.

7. The method of claim 6, wherein determining said tool health further comprises acquiring tool state data and analyzing said tool state data.

8. The method of claim 7, wherein acquiring tool state data further comprises acquiring at least one of pressure data, temperature data, humidity data, and gas flow rate data.

9. The method of claim 1, wherein determining an uncertainty level relating to said calculated control adjustments further comprises providing a higher uncertainty level in response to a determination that said time period is large.

10. A method, comprising:
    performing a process step upon a first workpiece;
    acquiring metrology data related to said first workpiece;
    determining a control adjustment based upon said metrology data;
    calculating a process disturbance relating to processing said first workpiece;
    determining a tool health relating to processing said first workpiece;
    determining an uncertainty level relating to said control adjustments based upon the process disturbance and the tool health within a time period defined by a first time frame relating to processing said first workpiece and a second time frame relating to acquiring metrology data related to said first workpiece; and
    adjusting a magnitude of said control adjustment based upon a determination that said uncertainty level exceeded a predetermined threshold.

11. An apparatus, comprising:
    means for performing a process step upon a first workpiece;
    means for acquiring metrology data related to said first workpiece;
    means for determining a control adjustment based upon said metrology data;
    means for determining an uncertainty level relating to said control adjustment; and
    means for modifying a magnitude of said control adjustment based upon said uncertainty level associated with a time period defined by a first time frame relating to processing said first workpiece and a second time frame relating to acquiring metrology data related to said first workpiece.

12. A system, comprising:
    a processing tool to process a workpiece;
    a metrology tool to acquire metrology data relating to said first workpiece; and
    a process controller operatively coupled to said processing tool and said metrology data, said process controller to determine a control adjustment based upon said metrology data, determine an uncertainty level relating to said control adjustment, and modify a magnitude of said control adjustment based upon said uncertainty level associated with a time period defined by a first time frame relating to processing said workpiece and a second time frame relating to acquiring metrology data related to said workpiece.

13. The system of claim 12, wherein said workpiece is a semiconductor wafer.

14. The system of claim 12, further comprising:
    a tool state data acquisition unit operatively coupled to said process controller and to said processing tool, said tool state data acquisition unit to acquire tool state data relating to an operation performed by said processing tool;

a fault detection and classification (FDC) unit operatively coupled to said process controller, said fault detection and classification unit to perform said fault detection process;

a process disturbance unit to calculate a process disturbance relating to said processing tool;

a metrology lag unit to determine said time period;

a control magnitude adjustment unit to determine a modification for said control adjustment; and a feedback/feed-forward unit to perform at least one of a feedback and a feed-forward process control.

15. The system of claim 14, further comprising a database unit to store said at least one of metrology data, said tool state data, and said electrical test data.

16. The system of claim 14, wherein said tool state data acquisition unit comprises at least one of a pressure sensor, gas flow sensor, temperature sensor, humidity sensor, and an electrical sensor.

17. An apparatus, comprising:
a process controller to determine a control adjustment based upon metrology data relating to processing a workpiece, determine an uncertainty level relating to said control adjustments and modify a magnitude of said control adjustment based upon said uncertainty level associated with a time period defined by a first time frame relating to processing said workpiece and a second time frame relating to acquiring metrology data related to said workpiece.

18. The apparatus of claim 17, wherein said workpiece is a semiconductor wafer.

19. The apparatus of claim 17, further comprising:
a tool state data acquisition unit operatively coupled to said process controller and to said processing tool, said tool state data acquisition unit to acquire tool state data relating to an operation performed by said processing tool;

a metrology tool operatively coupled to said process controller and to said processing tool, said metrology tool to acquire metrology data relating to said processed, workpiece;

a fault detection and classification (FDC) unit operatively coupled to said process controller, said fault detection and classification unit to perform said fault detection process;

a process disturbance unit to calculate a process disturbance relating to said processing tool;

a metrology lag unit to determine said time period;

a control magnitude adjustment unit to determine a modification for said control adjustment; and a feedback/feed-forward unit to perform at least one of a feedback and a feed-forward process control.

20. The apparatus of claim 19, wherein said tool state data acquisition unit comprises at least one of a pressure sensor, gas flow sensor, temperature sensor, humidity sensor, and an electrical sensor.

21. A computer readable program storage device encoded with instructions that, when executed by a computer, performs a method, comprising:
performing a process step upon a first workpiece;
acquiring metrology data related to said first workpiece;
determining a control adjustment based upon said metrology data;
determining an uncertainty level relating to said control adjustment; and modifying a magnitude of said control adjustment based upon said uncertainty level associated with a time period defined by a first time frame relating to processing said first workpiece and a second time frame relating to acquiring metrology data related to said first workpiece.

22. The computer readable program storage device encoded with instructions that, when executed by a computer, performs the method of claim 21, wherein performing said process step upon said workpieces further comprises performing said process step upon a semiconductor wafer.

23. The computer readable program storage device encoded with instructions that, when executed by a computer, performs the method of claim 21, further comprising implementing said modified control adjustment for processing a second workpiece.

24. The computer readable program storage device encoded with instructions that, when executed by a computer, performs the method of claim 23, wherein determining a control adjustment based upon said metrology data further comprises analyzing said metrology data, determining whether a process error exists on said first workpiece, and modifying at least one control input parameter for processing said second workpiece.

25. The computer readable program storage device encoded with instructions that, when executed by a computer, performs the method of claim 21, wherein modifying said magnitude of said control adjustment based upon said time period further comprises:
calculating a process disturbance relating to processing said first workpiece;
determining a tool health relating to processing said first workpiece;
determining an uncertainty level relating to said calculated control adjustments based upon said process disturbance and said tool health within said time period; and
reducing said magnitude of said process adjustment based upon a determination that said uncertainty level is above a predetermined threshold.

26. The computer readable program storage device encoded with instructions that, when executed by a computer, performs the method of claim 21, wherein calculating a process disturbance relating to processing said first workpiece further comprises calculating a difference between a predicted process result and an actual process result.

27. The computer readable program storage device encoded with instructions that, when executed by a computer, performs the method of claim 26, wherein determining said tool health further comprises acquiring tool state data and analyzing said tool state data.

28. The computer readable program storage device encoded with instructions that, when executed by a computer, performs the method of claim 27, wherein acquiring tool state further comprises acquiring at least one of pressure data, temperature data, humidity data, and gas flow rate data.

29. The computer readable program storage device encoded with instruction that, when executed by a computer, performs the method of claim 21, wherein determining an uncertainty relating to said calculated control adjustments further comprises providing a higher uncertainty level in response to a determination that said time period is large.

* * * * *